Aug. 23, 1938.　　　H. O. SCHULZ　　　2,128,168
AUTOMOBILE CRIB CONSTRUCTION
Filed July 1, 1937　　　4 Sheets-Sheet 1

INVENTOR
Hugo O. Schulz

Aug. 23, 1938.     H. O. SCHULZ     2,128,168
AUTOMOBILE CRIB CONSTRUCTION
Filed July 1, 1937     4 Sheets-Sheet 2
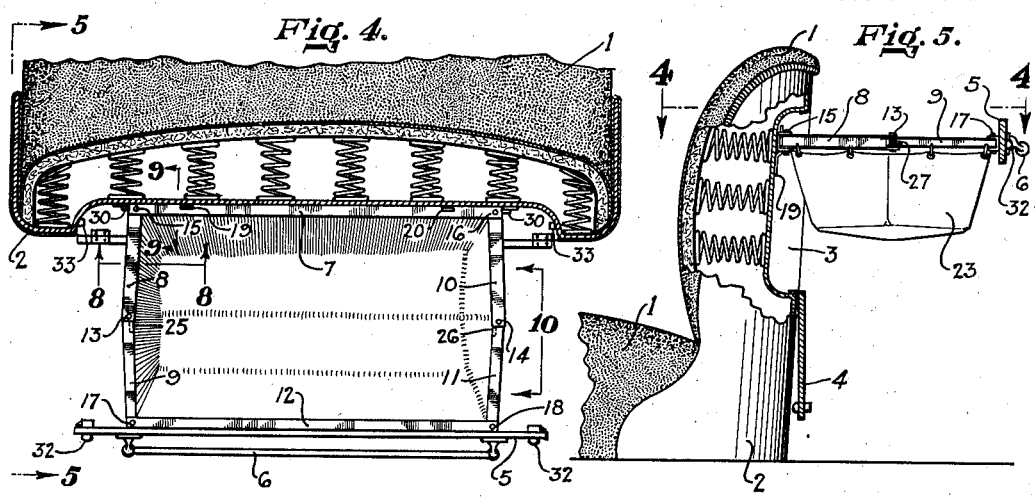
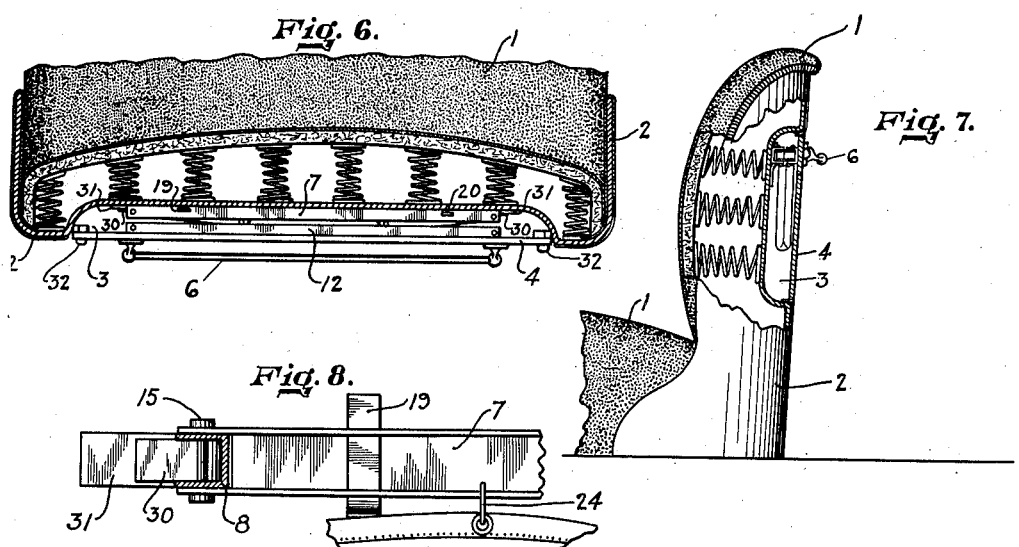
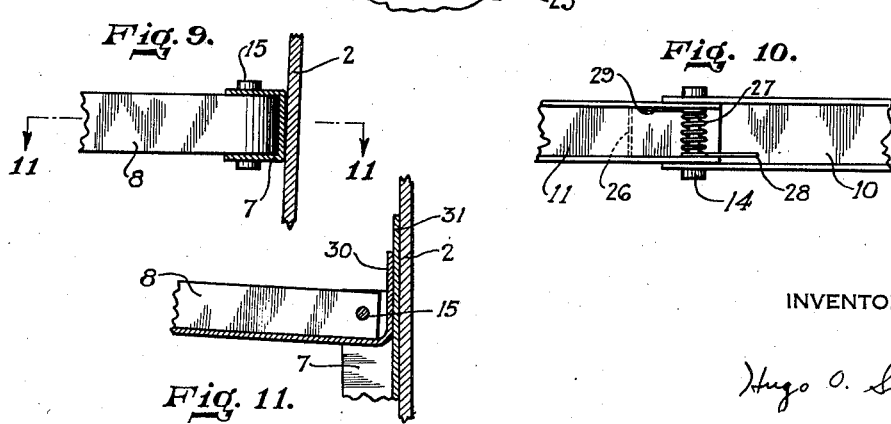
INVENTOR
Hugo O. Schulz Aug. 23, 1938.  H. O. SCHULZ  2,128,168
AUTOMOBILE CRIB CONSTRUCTION
Filed July 1, 1937  4 Sheets-Sheet 3
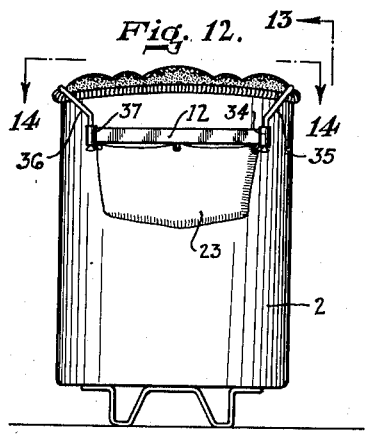
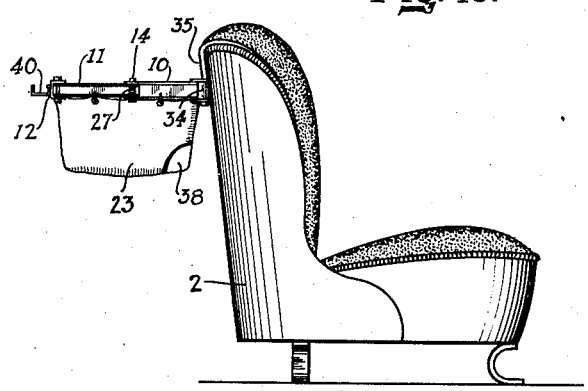
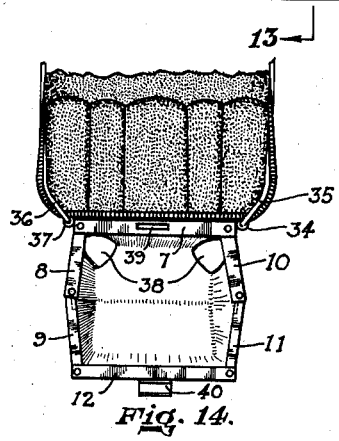
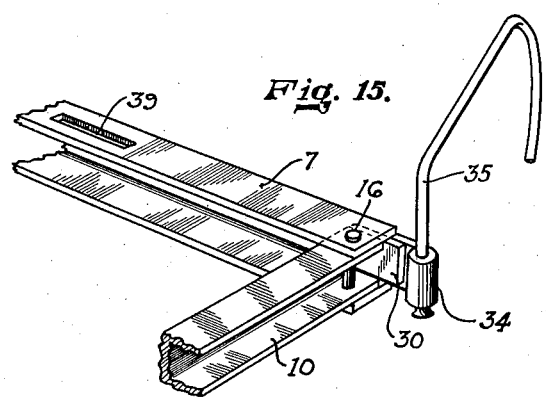
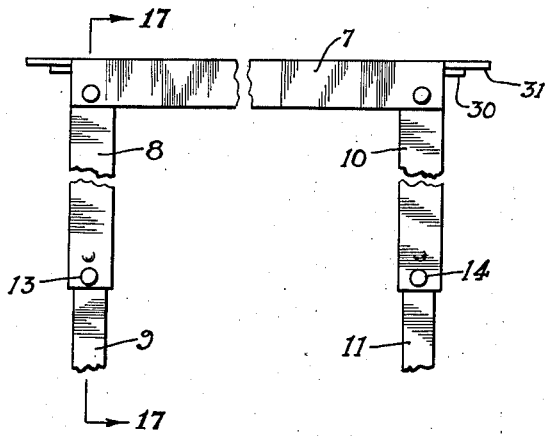
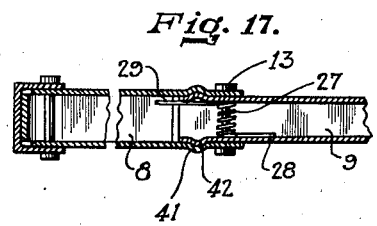
INVENTOR
Hugo O. Schulz Aug. 23, 1938.        H. O. SCHULZ        2,128,168
AUTOMOBILE CRIB CONSTRUCTION
Filed July 1, 1937        4 Sheets-Sheet 4

INVENTOR
Hugo O. Schulz

Patented Aug. 23, 1938

2,128,168

UNITED STATES PATENT OFFICE 2,128,168

AUTOMOBILE CRIB CONSTRUCTION

Hugo O. Schulz, Grantwood, N. J.

Application July 1, 1937, Serial No. 151,387

7 Claims. (Cl. 5—94)

My invention is directed to a crib construction which is particularly adapted to an automobile seat.

It is an object of my invention to provide such a crib associated with an automobile seat in such a manner that when not being used, said crib can readily be collapsed and folded into the recessed back of the automobile seat. On the other hand, if the crib is to be used, it is a simple matter to release a latch means which will allow the crib to automatically spring outwardly into a position for use.

It is a further object of my invention to construct such a crib which, after it is released, is automatic in its operation so that it may be presented for use. The operation of collapsing the crib is simple and when in such a condition takes a minimum amount of space.

A further object of my invention is to provide such a crib which is sturdy, and requires no lateral supporting means or braces. Said crib is further constructed so that it is readily detachable from the back of the automobile seat, in the event that repairs are to be made or for any other desirable reason.

It is a further object of my invention to attach said crib to the automobile seat in such a manner that it is built into the recessed back of an automobile seat. If there is no necessity for using the crib, the recessed compartment in the back of the automobile seat might readily be used as a storage compartment. I contemplate using my invention both on the rear of sedan seats and coach seats.

A further object is the construction of a crib or carrier so arranged that it is portable and can readily be attached or detached quickly from the seat. This portable arrangement, however, is also collapsible.

It is a prime object of my invention to construct a carrier which is collapsible in such a manner that it offers no obstruction or undesirable appearance to the rear of a car when not in use.

These and other objects, which will become apparent as the disclosure of the invention proceeds, I attain by my invention, various embodiments of which are shown in the following figures of the attached drawings, in which:

Fig. 4 is a plan view of the crib in association with a seat construction shown partly in section.

Fig. 5 is a side elevational view taken in the direction of arrows 5—5 of Fig. 4.

Fig. 6 is a plan view of the carrier in its collapsed condition and its association with the seat, the latter being shown partly in section.

Fig. 7 is a side elevational view showing the collapsed carrier attached and housed in the rear of a seat construction.

Fig. 8 is a detail view of the carrier taken in the direction of arrows 8—8 of Fig. 4.

Fig. 9 is a fragmentary sectional detail view showing the connection of the carrier to the seat, and taken through the plane 9—9 of Fig. 4.

Fig. 10 is a fragmentary side elevational view of the hinged construction taken in the direction of arrows 10, in Fig. 4.

Fig. 11 is a sectional plan view taken through the plane 11—11 of Fig. 9.

Fig. 12 is a rear elevational view of a modification of my invention showing a portable carrier attached to the rear of a coach seat.

Fig. 13 is a side elevational view of the carrier of Fig. 12, taken in the direction of arrows 13—13 of Fig. 12.

Fig. 14 is a plan view of Fig. 12 taken in the direction of arrows 14—14 of Fig. 12.

Fig. 15 is a fragmentary perspective view of a detail showing the manner of attachment of the supporting hook to the carrier.

Fig. 16 is another modification of the crib frame construction.

Fig. 17 is a sectional view taken through the plane 17—17 of Fig. 16.

Figure 1:
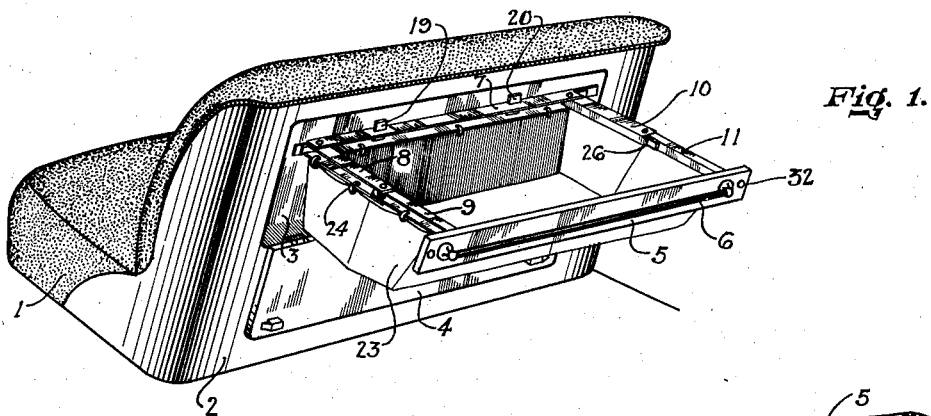
Fig. 1 is a perspective view showing the crib in position for use and attached to the rear of a sedan seat.
Figure 2:
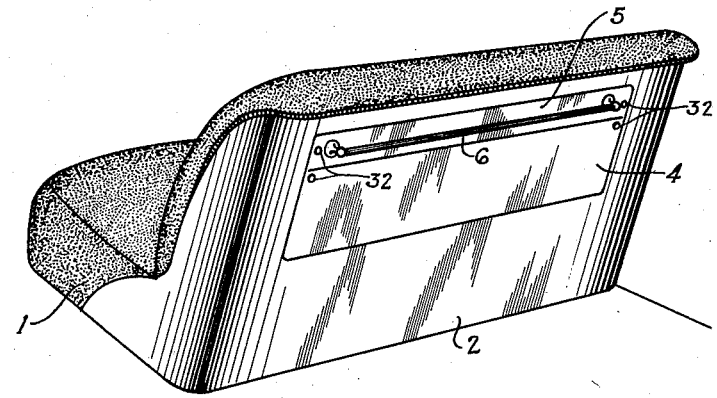
Fig. 2 is a perspective view showing the appearance of the back of a sedan seat when the crib is in a collapsed position out of use.
Figure 3:
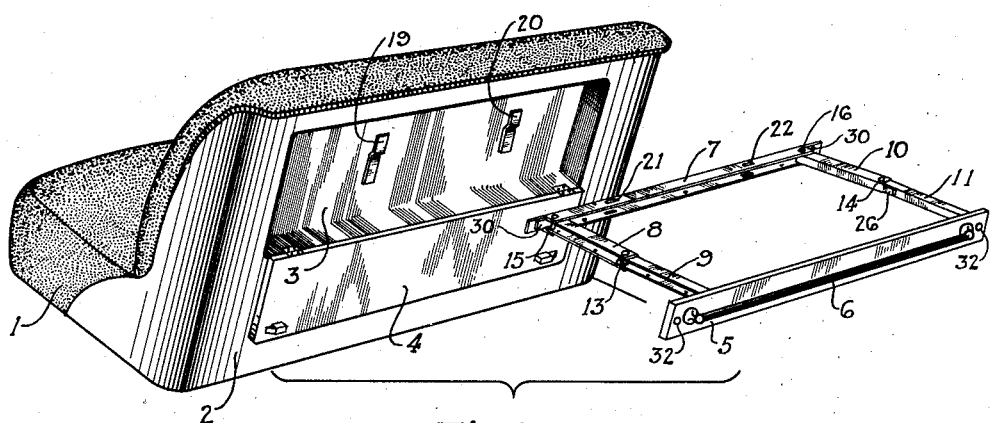
Fig. 3 is a perspective view illustrating the manner of attachment of the crib frame with the back of a sedan seat.

In Figs. 1 and 2 it will be noted that the carrier frame which supports the canvas bag 23, is associated with an automobile seat, indicated by the reference 1. In this particular case, the sedan seat 1, has a back 2. This back 2 is recessed as indicated by numeral 3. Supporting brackets 19 and 20 are welded to the inside wall of the recess as indicated in Fig. 3. The carrier frame structure is adapted to be attached or detached to the bracket members 19 and 20.

The carrier frame structure itself comprises four sides. There are two longitudinal sides 7 and 12, the latter being attached to the back member 5. This member, as clearly shown in Figures 1, 2 and 3, supports a conventional robe rod 6. The side members of the frame structure comprise a pair of arms 8 and 9, and a second pair of arms 10 and 11. It should be noticed in Figs. 1 to 11, that the members of the frame structure are made from channel bars. This is a particularly desirable construction, insofar as it lends strength to the carrier and does away with any necessary lateral support for said carrier. The side arms 10 and 11 are pivoted to each other by means of a hinge pin 14. The outer extremities of the arms 10 and 11 are pivoted respectively to the members 7 and 12 by other hinge pins 16 and 18. This construction is shown quite clearly in Fig. 4. This manner of attachment is duplicated for the arms 8 and 9 which have analogous hinge pins 13, 15 and 17, which connect the arms together as also with the longitudinal members 7 and 12.

Figs. 4 and 5 show the carrier in an extended position, ready for use. It is possible to collapse this carrier and house the same within a recess 3 when it is not being used. In order to collapse the carrier, it is merely necessary for one to swing the arms 9 and 11 inwardly toward each other, about the respective pivots 17 and 18. With such an operation being performed, the longitudinal member 12 will move inwardly toward the back of the seat 2. Then, by merely pushing the wall member 5, or robe rod 6, completely in against the back wall 2, the conventional latches 32 will engage keepers 33 so as to maintain the carrier in a collapsed condition, as shown in Figs. 6 and 7. It will be noted from Figs. 1 to 3 that a pivoted door 4 is then swung upwardly as in Fig. 7, to completely conceal the canvas carrier 23 within its housing recess 3. This condition is illustrated in Fig. 2, from which it will be evident that the back wall of the seat 2 has not been obstructed by the attachment of my carrier.

Similar latches as 32, and keepers as 33, can be provided to retain the door 4 in a closed position. As shown in Figs. 6 and 7, the depth of the recess 3 to accommodate my carrier construction is not appreciable and will not affect the comfort of the seat so far as its construction is concerned. Naturally, if necessary, the depth of the recess 3 can be diminished in accordance with engineering design, depending upon the strength of materials used and the particular construction of the carrier itself.

In order to present the carrier frame from a condition of Fig. 6 to the condition of Fig. 4, it is merely necessary to lower the door 4 by the release of latches 32 and then to release the back member 5 by the release of similar latches 32 mounted thereon. I provide automatic means that will project the carrier frame from its collapsed condition of Fig. 6 to its extended position of use of Fig. 4. This automatic structure is in the form of springs provided on hinged pins 13 and 14, which are adapted to co-act with the respective arm members 8, 9 and 10, 11.

As shown in Fig. 10 in greater detail, a coil spring 27 is wound about the pin 14. The extremities 28 and 29 of this spring act against the side arms 10 and 11 respectively. The normal reaction of this spring 27 is to swing the arms 10 and 11 to the position indicated in Fig. 4. Thus by collapsing the frame structure and folding the arms 10 and 11 upon themselves about their common pivot 14, the coil spring 27 is actually wound up or tensioned. A similar spring is positioned in like manner on the pin 13. Thus it is apparent that with a release of the latches 32 on the back member 5, the springs 27 will immediately project the carrier forward to a position as indicated in Figs. 4 and 5.

In order to limit this outward swinging of the arms 10 and 11 about their pivotal connecting pin 14, I provide a stop member 26 which is an extension of the web of the channel member 10, as more clearly shown in Figs. 1 and 3. This stop member 26 cooperates with the web of the channel member 11, and thus limits the outward movement of the members 10 and 11 to a position just beyond their straight line condition. A similar stop 25 (Fig. 4) is formed as an extension of the channel member 8 and cooperates with the channel arm 9, and this stop likewise retains the arms 8 and 9 in a position slightly beyond a direct alignment of these members. This condition of the side arm members is clearly illustrated in Fig. 4, from which it will also be noted that these stops 25 and 26 prevent the longitudinal member 12 from moving in toward the longitudinal member 7 when the weight of the youngster is in the canvas carrier 23. It should be noticed also that there are additional stops 30, provided on the arms 8 and 10 to limit their pivotal movements about the respective pivot pins 15 and 16.

Referring to Figs. 9 and 11, it will be noted that the channel arm member 8 has an extension in the form of stop 30. This stop 30 really is an extension of the web of channel member 8. As further illustrated in Fig. 11, the web of channel member 7 has an extension illustrated by the character 31, which acts as a bearing surface for the stop member 30. A similar stop arrangement 30 and 31 is provided for the arm member 10. As shown in Fig. 8, the longitudinal channel member 7 has such an extended web 31. The channel member 7 is supported by the brackets 19 and 20 as shown in Figs. 1, 3 and 8. These brackets extend through slots 21 and 22 in the legs of the channel 7. This construction provides a ready means of attaching or removing the carrier frame construction with great ease (note Fig. 3). Also as illustrated in Figs. 1 and 8, the canvas carrier bag 23 is attached to the lower leg of the frame channel members by means of clips 24. These clips can be of a conventional type which permit ready detachability of the canvas bag from its frame structure. The canvas bag is seamed as illustrated in Fig. 1, so that when the carrier frame is collapsed, it will neatly fold upon itself. It should be noticed from Figs. 1 and 3 that the stop 26 engages the web of channel arm member 11 in a recess of the member 11. This is illustrated also by the dotted line construction of stops 25 and 26 in Fig. 4.

With my carrier set up for use as shown in Fig. 4, it will be realized that this carrier has a certain degree of flexibility. Thus the arm 8 is limited by stop 30, from rotating any farther in a clockwise direction about pivot 15 in Fig. 4.

Likewise, in the same figure the arm 10 cannot rotate any farther in a counter-clockwise direction about the pivot pin 16. The arm 11 can rotate about the pivot pin 14 in a counter-clockwise direction, by which movement it will wind the spring 27 on the pin 14. Similarly, the arm 9 can rotate in a clockwise direction about the pin 13, thus winding the corresponding spring 27 on the said pin 13. It will thus be seen that if there is a certain amount of car sway which tends to move the frame structure to the right of Fig. 4, the arms 8 and 9, as a unitary member, will pivot about the pin 15 in a counter-clockwise direction. At the same time, the arm 11 will pivot in a counter-clockwise direction about the pin 14. The amount of this flexibility can be controlled by the strength of the springs 27. So likewise if the car sways so that the carrier has a tendency to move to the left of Fig. 4, the arms 10 and 11 will swing as a unit in a clockwise direction about the pivot pin 16, whereas, at the same time the arm 9 will pivot about the pin 13 in a clockwise direction. This flexibility will permit the frame structure of the carrier to sway to a limited extent with the movement of the automobile. As previously pointed out, this degree of flexibility can be controlled by the selected strength of the springs 27.

In Figs. 12 to 15, I have shown my invention applied to a child carrier of the portable type that might be readily hooked over a seat; in this particular case, a coach seat of an automotive vehicle. In these figures, similar reference characters denote similar parts of the frame construction as designated in Figs. 1 to 11 inclusive. It will be noticed that the canvas carrier bag 23 is of the type which permits a youngster to be seated in the same, with his legs projecting through the holes 38 of the canvas carrier. In this particular construction of the carrier frame the longitudinal member 7 has bearing members 34 and 37 for receiving the respective hook members 35 and 36. As illustrated in Fig. 15, the bottom of the hook member is upset for permanent attachment. The construction of the carrier frame is otherwise the same except that a special latch means in the form of pivoted hook member 40 and slot 39 is provided. When the carrier is in its collapsed position of non-use, with the longitudinal member 12 moved to a position adjacent to the longitudinal member 7, the pivoted latch 40 is inserted into the slot 39 so as to positively retain the carrier in a collapsed condition.

Figs. 16 and 17 show modifications of the frame construction wherein the respective arms 8, 9 and 10, 11 are not moved beyond a straight line position. In this construction the springs 27 are used on the pivot pins 13 and 14. However, the arms 8 and 9 are brought into direct alignment, as also the arms 10 and 11, by the springs 27. Then these arms are locked in their straight line condition by means of the notched channel legs 41, 42 of the channel members 8 and 9 respectively. Similar notching is provided on the channel arms 10 and 11, for locking these in a straight line condition. The carrier is otherwise similar to the construction previously set forth.

Figures 18, 19:
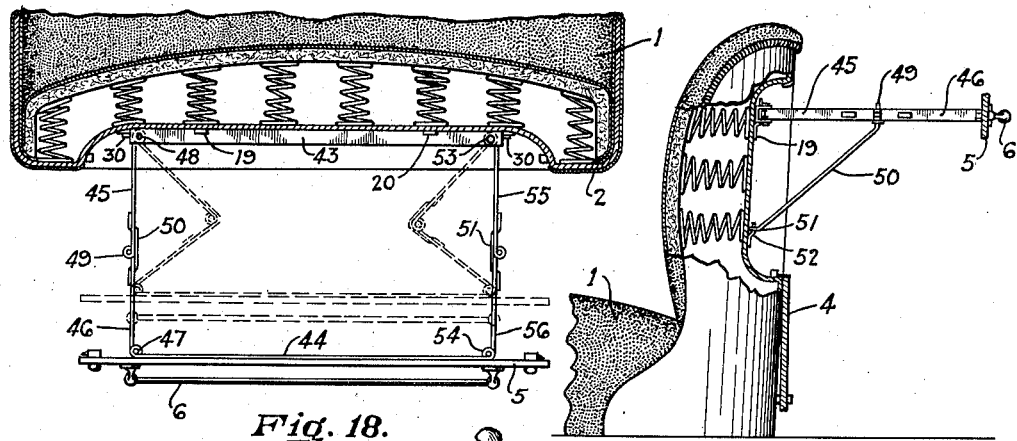
Fig. 18 is a plan view showing another modification of my invention in association with the back of an automobile seat, said modification having lateral brace members.
Fig. 19 is a side elevational view of the construction set forth in Fig. 18, partly shown in section.
Figures 20, 21:
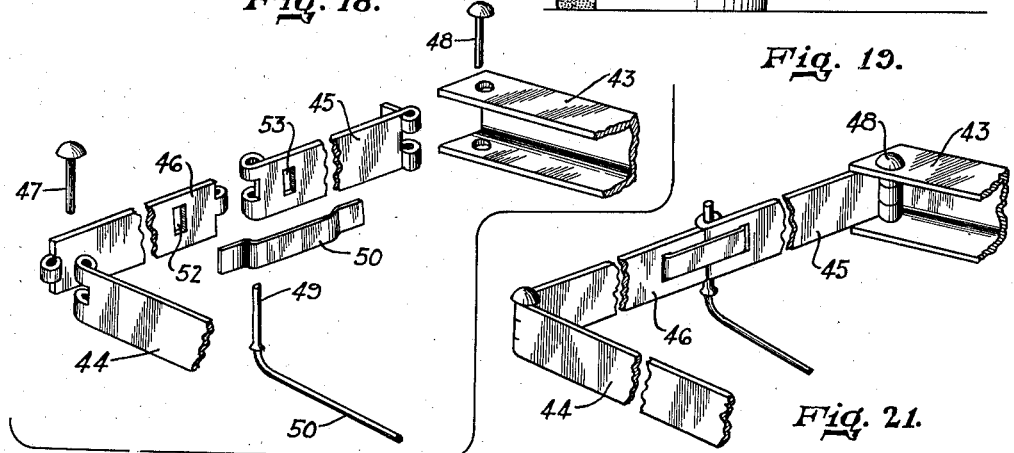
Fig. 20 is an explosion view in perspective, showing the relationship of the various parts of the frame construction before assembly.
Fig. 21 is a perspective view showing the various parts of the frame construction of Fig. 20 in their assembled condition.

In Figs. 18 to 22 inclusive, I have shown another modification of my invention wherein I have dispensed with channel members for the side arms of my carrier frame construction. I have also provided lateral brace members where these should be deemed necessary. It should be understood that my invention can be practiced without these lateral members, although if lateral support of this character is deemed desirable, it can readily be applied in the manner indicated in my construction of Figs. 18 to 22. In these figures I have shown the longitudinal members of the frame construction as 43 and 44. The member 43 is a channel member which has provision for attachment to the rear of the seat by means of brackets 19 and 20, as heretofore disclosed. The other longitudinal member 44 is a plain longitudinal metal strip attached to the back member 5, which as heretofore disclosed supports the robe rod 6. The side members comprise pairs of arms 45, 46 and 55, 56. These arms are plain metal strips with provision for forming hinges at their respective ends, as clearly illustrated in Fig. 20. The arm 45 has one end hinged to channel 43 by means of pin 48. The arm 46 has its one end hinged to the longitudinal member 44 by means of a pin 47. The arms 45 and 46 are hinged together about a common pivot by means of the pin 49, which in reality is an extension of a lateral brace 50. So also the arms 55, 56 are hinged together and their opposite ends are pivoted by pins 53 and 54 to the respective longitudinal members 43 and 44. In this particular construction, I prefer to use a flat spring 50 in preference to the coil spring 27 heretofore disclosed. This leaf-spring 50 engages within the recesses 52, 53 of the arms 46, 45 respectively. A similar construction prevails with respect to the arm members 55, 56 which are hinged together and associated with a leaf-spring 51. Stops 30, are provided for the arms 45 and 55, to limit their extended position as shown in Fig. 18.

Figure 22:
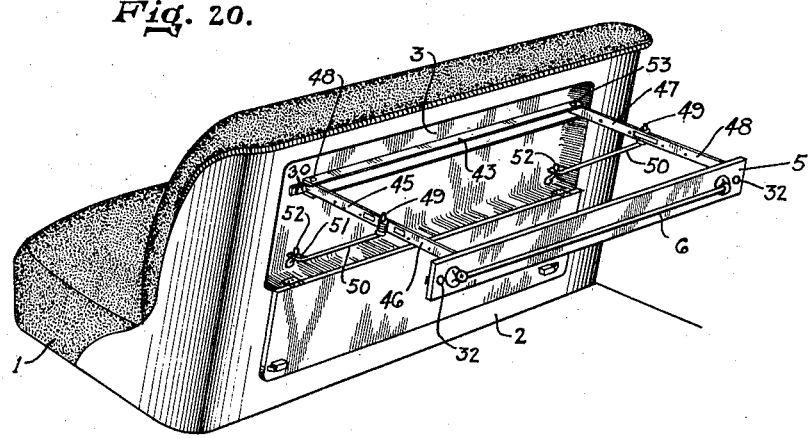
Fig. 22 is a perspective view of the modified construction of Figs. 18 to 21, shown in conjunction with the rear of an automobile seat.

It will thus be seen that in order to collapse this carrier of Fig. 18 into a position of non-use, it is merely necessary to break the side arms 45, 46 and 55, 56 inwardly, as illustrated by dotted lines in Fig. 18. The collapse of the carrier in this manner will tension the leaf-springs 50 and 51. Thus upon release of the carrier from a collapsed position to an extended position of use, these leaf-springs project the carrier frame forward to the full line position of Fig. 18. The lateral bracing members 50 which form the hinge pins 49, extend downwardly as shown in Figs. 19 and 22, and the lower end of each brace 15 is apertured to pivot in a horizontal plane about the pin 52. These pins 52 are welded to the inside wall of the recessed compartment 3, and they are located directly below and in alignment with the frame hinge pins 48 and 53. Thus, when the frame structure is collapsed so that the arms 45 and 55 are swung inwardly, the lateral braces 50 will also swing inwardly about the pins 52. This function takes place without any interference with the canvas carrier attached to the frame structure. Though such a canvas carrier is not shown in Figs. 18 to 22, it will be understood that it is adapted for ready attachment thereto, as disclosed previously in Figs. 1 and 8.

It will thus be seen that I have provided a carrier construction in the form of a crib for attachment to the rear of an automobile seat. This construction is of a type, whereby it can be collapsed and stored within a recess in the back of a seat. The construction for storage is such that when the carrier is not being used, it does not detract from the appearance of the seat construction. It is apparent that if it is desirable to use the carrier, the operation of bringing it into use is simple and automatic. At the same time, it is also apparent that if the carrier is not being used, then the canvas bag can be detached from the frame so that the recess in the back wall of the seat can be used as an ordinary storage compartment.

It is obvious that various changes can be made by one skilled in the art, which changes may not deviate from the spirit of this invention which I cover by the following claims:

I claim:

1. A collapsible crib for attachment to the wall of an automobile seat, comprising a substantially rectangular frame structure for supporting a carrier, means for mounting said frame structure upon the wall of said seat, said frame structure including longitudinal members and side members, each of the side members comprising a pair of arms pivoted to each other and pivoted at their opposite ends to the longitudinal members, stop means to limit outward swinging movement of the side arms relative to one of the longitudinal members, and spring means urging and maintaining said arms in an extended position limited by the stop means slightly beyond direct alignment thereby to prevent their collapse when the longitudinal members are subjected to inward forces, said rectangular frame structure having sufficient flexibility in the side members at their pivotal connections to allow side sway of the frame.

2. A collapsible crib for attachment to the wall of an automobile seat comprising a substantially rectangular frame for supporting a carrier, means for mounting said frame upon the wall of said seat, said frame including longitudinal members and side members, each of the side members including a pair of arms hinged to each other and pivoted at their opposite ends to the longitudinal members, a lateral brace for each pair of arms, one end of the brace being pivotally associated with said arms at their hinge, the opposite end of the brace being mounted to permit inward swinging movement thereof with the side arms when the frame is collapsed for non-use, stop means to limit outward swinging movement of said arms relative to one of the longitudinal members, and spring means urging and maintaining said arms in an extended position limited by the stop means thereby to form continuous side members, said continuous side members and longitudinal members forming a substantially rectangular frame having sufficient flexibility in the side members at their pivotal connections to allow side sway of the frame.

3. A collapsible crib for attachment to the wall of an automobile seat, comprising a substantially rectangular frame for supporting a carrier, means for mounting said frame upon the wall of said seat, said frame including longitudinal members and side members, each of the side members comprising a pair of arms, means for pivoting together the arms of each side member, the opposite ends of the side arms being pivotally connected with the longitudinal members, stop means to limit outward swinging movement of the side arms relative to one of the longitudinal members, and spring means associated with the side arms urging and maintaining said arms in an extended position limited by the stop means whereby they form with the longitudinal members a rectangular frame of sufficient flexibility in the side members at the pivotal connections to allow side sway of the frame, said spring means being tensioned when the side arms are moved inwardly about their pivotal connections to collapse the frame structure into a condition of non-use, said tensioned springs functioning to automatically project the frame into a substantially rectangular condition for use.

4. In combination with the back wall of an automobile seat recessed to form a compartment, a substantially rectangular frame structure for supporting a canvas carrier, means for mounting said frame upon the wall of said seat, said frame structure comprising side arms which are pivoted together so as to be collapsible upon themselves and longitudinal frame members pivotally attached to the side arms, stop means to limit outward swinging movement of the side arms relative to one of the longitudinal members, spring means associated with the side arms urging and maintaining said arms in an extended position limited by the stop means thereby to form with the longitudinal members a substantially rectangular frame having sufficient flexibility in the side members at their pivotal connections to allow side sway of the frame, one of said longitudinal members being so constructed and arranged as to lie in the plane of the back wall when the frame structure is in a collapsed condition, and a door associated with the back wall which is adapted to cover the canvas carrier within the recess and lie in the plane of the back wall when the carrier frame is in non-use.

5. A collapsible crib for attachment to the wall of an automobile seat, comprising a substantially rectangular frame for supporting a carrier, means for mounting said frame upon the wall of said seat, said frame including longitudinal members and side members, each of the side members comprising a pair of arms, means for pivoting together the arms of each side member, the opposite ends of the side arms being pivotally connected with the longitudinal members, stop means to limit outward swinging movement of said side arms relative to one of the longitudinal members, spring means associated with the side arms urging and maintaining said arms in an extended position limited by the stop means, said side arms having sufficient flexibility about their pivots to allow side sway of the frame, and catch means to lock the frame in a collapsed condition wherein the side arms are folded upon themselves and the spring means is tensioned, said tensioned spring means functioning to automatically project the frame into a substantially rectangular condition for use upon release of the catch means.

6. A collapsible crib for attachment to the wall of a vehicle seat comprising means for mounting said crib upon the wall of said seat, longitudinal members, side members each of which includes a pair of arms pivotally connected together, the opposite end portions of said arms being pivoted to the longitudinal members, stop means to limit outward swinging movement of said side arms relative to one of the longitudinal members, spring means normally urging and maintaining the side arms in an extended position limited by the stop means thereby to form continuous side members, said continuous side members and longitudinal members forming a substantially rectangular frame having sufficient flexibility in the side members at their pivoted connections to allow side sway of the frame, said spring means being tensioned when the side arms are moved inwardly about their pivotal connections to collapse the frame structure into a condition of non-use, said tensioned springs functioning to automatically project the frame into a substantially rectangular condition for use.

7. A collapsible crib for attachment to a vehicle seat, comprising a substantially rectangular frame for supporting a carrier, means for mounting said frame upon said seat, said frame including longitudinal members and side members, each of the side members comprising a pair of arms pivoted to each other and pivoted at their opposite ends to the longitudinal members, stop means to limit outward swinging movement of said side arms relative to one of the longitudinal members, spring means normally urging and maintaining said arms in an extended position limited by the stop means slightly beyond direct alignment, said rectangular frame having sufficient flexibility in the side members at their pivotal connections to allow side sway of the frame, and catch means to lock the frame in a collapsed condition wherein the side arms are folded upon themselves and the spring means is tensioned, said tensioned spring means functioning to automatically project the frame into a substantially rectangular condition for use upon release of the catch means.

HUGO O. SCHULZ.